M. A. BROWN.
AIR BRAKE COUPLING.
APPLICATION FILED MAR. 15, 1909.

953,458.

Patented Mar. 29, 1910.
3 SHEETS—SHEET 1.

Witnesses
Jas. F. McCathran
W. T. Riley

Mark A. Brown, Inventor
By E. G. Siggers
Attorney

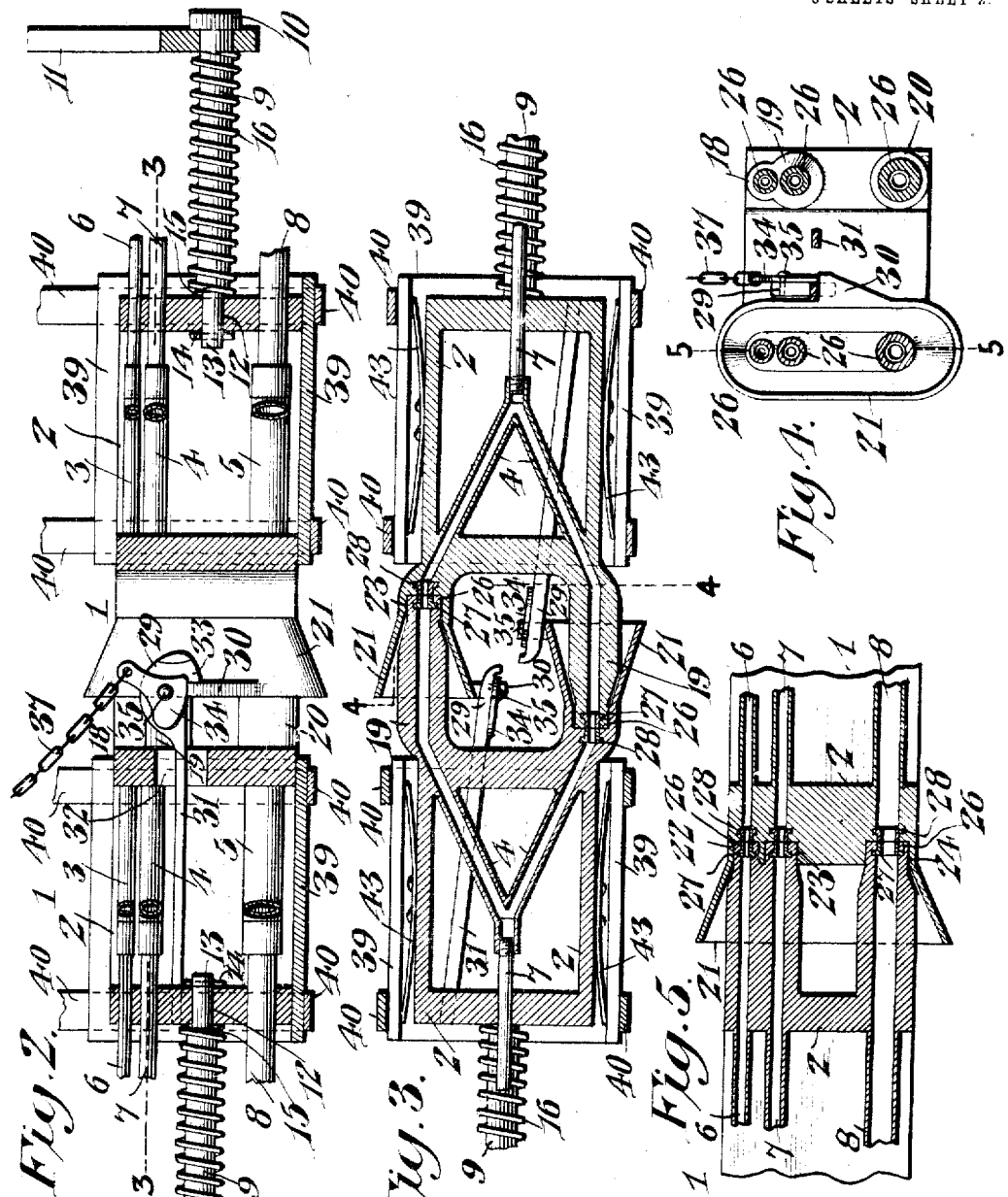

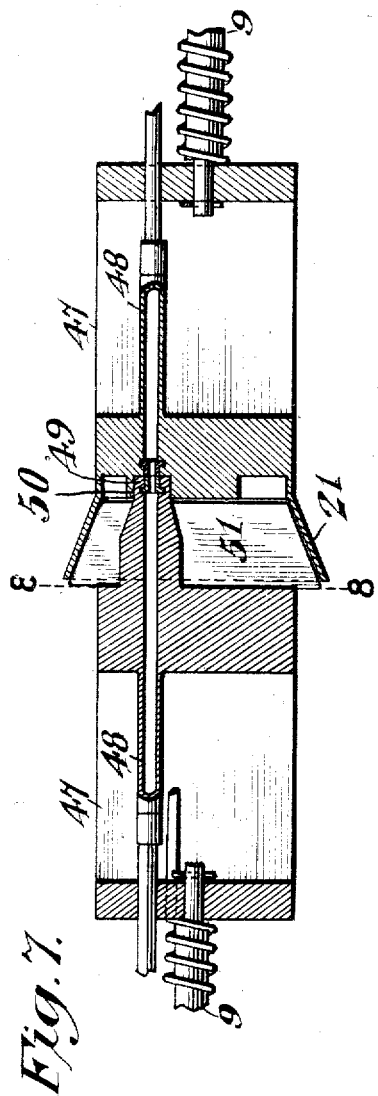
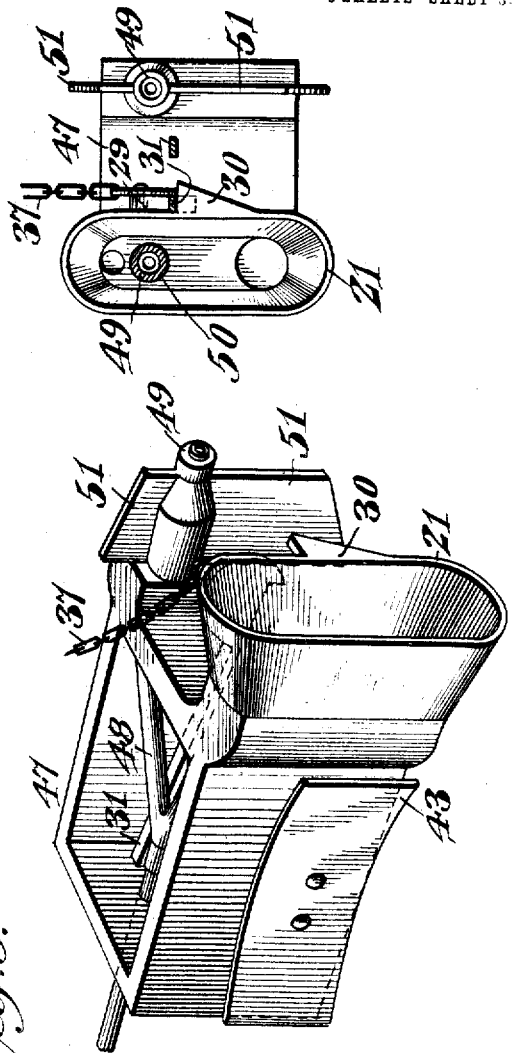

UNITED STATES PATENT OFFICE.

MARK A. BROWN, OF CHATTANOOGA, TENNESSEE, ASSIGNOR OF ONE-SIXTH TO WILLIAM H. MEACHAM, ONE-SIXTH TO ABRAHAM W. BOYD, AND ONE-SIXTH TO CHARLIE M. HARRINGTON, ALL OF CHATTANOOGA, TENNESSEE.

AIR-BRAKE COUPLING.

953,458.

Specification of Letters Patent. Patented Mar. 29, 1910.

Application filed March 15, 1909. Serial No. 483,461.

*To all whom it may concern:*

Be it known that I, MARK A. BROWN, a citizen of the United States, residing at Chattanooga, in the county of Hamilton and State of Tennessee, have invented a new and useful Air-Brake Coupling, of which the following is a specification.

The invention relates to improvements in air brake couplings.

The object of the present invention is to improve the construction of air brake couplings, and to provide a simple, inexpensive and efficient air brake coupling, capable of coupling and uncoupling automatically on curves as well as on straight tracks, and equipped with means for firmly locking two coupling heads together and for automatically unlocking the same to permit the coupler heads to separate without strain, when the cars to which they are connected are uncoupled.

Another object of the invention is to yieldably mount the coupling heads so as afford the necessary play, and to enable freight and passenger equipments to couple interchangeably.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
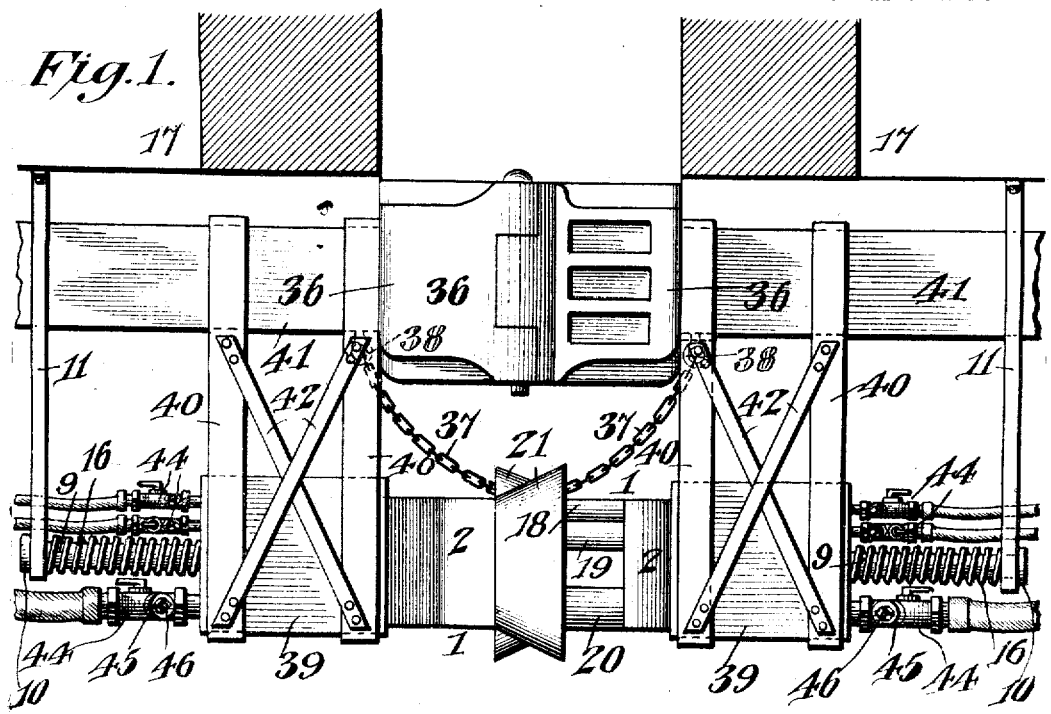
Figure 6:
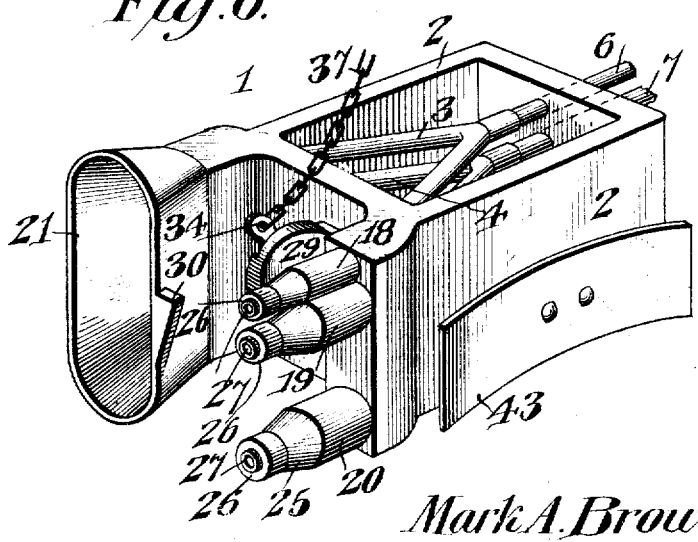

In the drawings:—Figure 1 is a side elevation of an air brake coupling, constructed in accordance with this invention, the frame of the car being in section. Fig. 2 is a longitudinal sectional view of the same. Fig. 3 is a horizontal sectional view, taken substantially on the line 3—3 of Fig. 2. Fig. 4 is a transverse sectional view, taken substantially on the line 4—4 of Fig. 3. Fig. 5 is a vertical sectional view on the line 5—5 of Fig. 4. Fig. 6 is a perspective view of one of the coupling heads. Fig. 7 is a longitudinal sectional view, illustrating the construction of the coupling for freight car equipments. Fig. 8 is a vertical sectional view, taken substantially on the line 8—8 of Fig. 7. Fig. 9 is a perspective view of one of the coupling heads.

Like numerals of reference designate corresponding parts in all the figures of the drawings.

1 designates a coupling head, designed for passenger car equipments and including an open rectangular frame 2, receiving upper, intermediate and lower V-shaped pipes or conduits 3, 4 and 5. The frame 2 is provided with parallel sides and ends, and the V-shaped pipes or conduits, which diverge outwardly, are preferably formed integral with the coupling head and are connected at the outer terminals of their sides with the front end wall of the frame 2. The rear ends of the V-shaped pipes or conduits are united and provided with tubular extensions to which the signal pipe 6, the train pipe 7 and the steam pipe 8 are detachably connected. The whistle signal pipe 6 and the train pipe 7 are located above the center of the rear or inner end of the frame, and the steam pipe is located below the center in order to provide a place for a rearwardly extending stem 9, consisting of a rod provided at its rear or inner end with a head 10 and extending through a combined guide and hanger 11, and secured at its outer end to the coupling head. The inner end wall of the coupling head is provided with a central opening 12 through which the stem passes. The outer or front end 13 of the stem is reduced to fit the opening 12, and is keyed or otherwise secured to the same. The key 14 is located within the frame 2, and the reduction of the front end of the stem forms a shoulder 15, which fits against the inner end of the frame. By this construction any one of the pipe connections 6, 7 and 8 may be uncoupled without taking down the coupler head or removing the coiled spring 16, disposed on the stem and interposed between the combined guide and hanger 11 and the inner end of the frame for yieldably forcing the coupler head outwardly. The combined guide and hanger 11, which depends from the car 17, is suitably secured to the same and is designed to provide a sufficient bearing for the spring to enable the same to firmly press two coupling heads in engagement with each other.

The coupling head is provided at one side with upper, intermediate and lower tubular extensions or nozzles 18, 19 and 20, and it has a vertically disposed oblong shell 21, located at the opposite side of the frame and provided in its inner end wall with upper, intermediate and lower sockets 22, 23 and 24, forming seats for the reception of the tubular extensions or nozzles 18, 19 and 20 provided on a complementary coupling of the adjoining car. The frame is provided at its front or outer end with vertical enlargements, and the tubular extensions or nozzles and the conical shell project from and are formed integral with the same. The tubular extensions or nozzles are provided with intermediate tapered portions 25, and they have cylindrical terminals 26 adapted to fit in the sockets 22, 23 and 24, which are of a depth to receive the cylindrical terminals of the nozzles, the tapered portions being arranged to coöperate with the side walls of the sockets to form air tight connections. The nozzles and the sockets may be equipped with gaskets 27 and 28, arranged to form an air tight joint or connection. When two coupling heads come together, the gaskets are simply compressed and as there is no grinding action or twisting of the parts in coupling, a rubber gasket will be found sufficient and endurable in such connection. The oblong shell is flared, and the tapered portions of the projecting tubular stems or nozzles coöperate with the angularly disposed walls of the shell in guiding the coupling heads in engagement with each other.

Each coupling head is equipped with a resilient catch 29 and a keeper flange 30. The catch 29 consists of a head and a resilient stem 31, extending through an opening 32 of the front wall of the frame and secured at its inner or rear end to the rear wall of the frame. The opening 32 permits a limited upward and downward movement for enabling the catch of one coupling head to engage the keeper flange of the other coupling head. The catch, which is beveled at the front, is provided at the bottom with a shoulder 33 to engage the keeper flange 30. The keeper flange extends transversely from the inner side of the oblong shell and is approximately triangular, being provided with a horizontal upper edge and having an inclined side edge. When two air brake couplers come together, the springs force the nozzles into engagement with the sockets, and the catches firmly lock the coupler heads in such engagement. Each catch is equipped with a cam lever 34, secured to the head of the catch by a pivot 35 and provided with a lower cam edge for engaging the keeper flange 30 and having an upwardly extending arm, which is connected with the car coupler 36 by a short chain 37, or other suitable flexible connection, whereby when the cars separate, the cam levers will be oscillated to lift the catches out of engagement with the keeper flange, so that the brake couplings will be automatically unlocked and effectually prevented from being strained or otherwise injured through the separation of the cars. The upper end of the chain 37 is linked into an eye or ring 38 carried by the car coupler, but it may be connected with the same in any suitable manner. The V-shaped conduits of the coupling heads provide two opposite uninterrupted passages for the air and afford a free passage of the same through the coupling, so that the efficiency of the air brake is not impaired, but is facilitated by the coupling, the double passage permitting the air to pass through the coupling practically as freely as if a straight pipe connection were employed.

The air brake coupling head is mounted in a hanger 39, consisting of a box-like support suspended from the car coupling by hanger loops 40, embraced and suitably secured to the draw head 41 of the car coupler. The hanger loops are preferably rectangular and receive the draw head 41 and the hanger 39, and they are braced by inclined metallic straps 42, arranged in pairs and crossing each other at the sides of the hanger, as clearly illustrated in Fig. 1 of the drawings. The hanger is provided with a horizontal bottom and parallel sides, and the frame of the coupling head is equipped with bowed springs 43, disposed longitudinally and secured at the center to the outer faces of the sides of the frame 2 and having free terminals engaging the inner faces of the sides of the hanger, as clearly shown in Fig. 3 of the drawings. These springs yieldably maintain the frames in spaced relation with the side walls of the hanger, and when two coupling heads are firmly coupled and locked, they permit a horizontal play or movement of the parts. The air brake couplings by being suspended from the car couplers partake of the lateral and longitudinal movement thereof, and they are also capable of independent longitudinal movement through the coiled springs 16. This compound cushioning of the air brake couplings prevents the latter from being injured through the jar and vibration of the cars of a train.

Each of the pipes 6, 7 and 8 is equipped with a three-way cock 44, having a lateral coupling branch 45, normally closed by a screw plug 46 and adapted to enable an ordinary hose coupling to be connected with the several pipes when a car equipped with the improved air brake couplings is connected with a car having the ordinary air brake couplings. The three-way cock is also adapted to take the place of the ordinary angle cock for cutting off the air when the cars are to be uncoupled.

In Figs. 7 to 9 inclusive is illustrated an air brake coupling designed for freight cars. The coupling head 47 differs from that heretofore described in that it is equipped with a train pipe conduit 48 only, the whistle signal conduit and the steam conduit being omitted. The train pipe conduit 48 occupies a position corresponding to the train pipe conduit of the coupling head 1, and the projecting nozzle or stem 49 and the socket 50 occupy similar positions so that the train pipe connections of the air brake coupling of the freight car equipment will couple properly with the air brake coupling of the passenger equipment. The coupling head 47 is provided with a vertical guiding flange 51, extending upwardly and downwardly from the stem or nozzle 49 and adapted to positively guide the said stem or nozzle 49 into engagement with the intermediate nozzle of a passenger air brake coupling. The locking mechanism of the coupling head 47 and the manner of mounting the latter are the same as that heretofore described.

Having thus fully described my invention, what I claim as new and desire to secure by Letters Patent, is:—

1. An air brake coupling including a coupling head comprising an open frame, a substantially V-shaped conduit arranged within and connected at the outer portions of its sides with the outer end of the frame, a nozzle extending from one side of the frame and connected with one side of the conduit, and a shell projecting from the other side of the frame and having a seat located at the terminal of the adjacent side of the conduit.

2. An air brake coupling including a coupling head comprising a substantially rectangular open frame, a substantially V-shaped conduit located within and connected at the outer portion of its sides with the outer end of the frame, a nozzle extending from one side of the frame and connected with one side of the said conduit, and a shell projecting from the other side of the frame and having a seat located at the terminal of the other side of the said conduit.

3. An air brake coupling including a coupling head comprising an open rectangular frame, a V-shaped conduit located within the frame having outwardly diverging sides connected at the outer ends with the front of the frame, a projecting nozzle extending from one side of the frame and connected with the adjacent side of the said conduit, and a vertically disposed oblong shell projecting from the opposite side of the frame and having a seat located at the outer terminal of the other side of the conduit.

4. An air brake coupling including a coupling head comprising an open rectangular frame, a V-shaped conduit having outwardly diverging sides connected with the front of the frame, a projecting nozzle extending from one side of the frame and connected with the adjacent side of the said conduit, a vertically disposed oblong shell projecting from the opposite sides of the frame and having a seat located at the outer terminal of the other side of the conduit, and a pipe piercing the rear end of the frame and detachably connected with the said conduit at the juncture of the sides thereof.

5. An air brake coupling including an open frame, a conduit arranged within the frame and having diverging sides connected at the outer ends with the front of the said frame, a nozzle projecting from the frame and communicating with one of the sides of the conduit, said frame having a seat located at the other side of the frame and communicating with the said conduit, a pipe connection piercing the rear end of the frame and connected with the conduit at the juncture of the said sides, and a cock carried by the said pipe connection and having a lateral coupling.

6. An air brake coupling including a coupling head comprising an open frame, a plurality of conduits arranged within the frame and having sides connected with the front of the frame, said conduits being spaced from the center of the frame, a series of nozzles extending from one side of the frame and communicating with the adjacent sides of the conduits, a vertically disposed oblong shell projecting from the opposite side of the frame and provided at its inner end walls with seats corresponding with the conduits, a stem extending rearwardly from the center of the rear end of the frame, and a coiled spring mounted on the stem and engaging the frame.

7. An air brake coupling including a coupling head comprising an open frame, upper, intermediate and lower V-shaped conduits arranged within the frame and connected with the front wall thereof and terminating short of the rear wall and located above and below the center of the frame, upper, intermediate and lower nozzles projecting from one side of the frame and connected with the conduits, an oblong shell located at the other side of the frame and having seats arranged at the adjacent sides of the conduits, pipe connections piercing the rear wall of the frame and coupled to the conduits at the juncture of the sides thereof, and centrally arranged cushioning means engaging the rear end of the frame.

8. In an air brake coupling, the combination with two coupling heads, each provided at one side with a projecting nozzle and having a projecting shell at the opposite side, a keeper flange extending from the shell of one of the coupling heads, and a catch mounted on the other coupling head for engaging the said flange.

9. In an air brake coupling, the combination with two coupling heads, each provided at one side with a projecting nozzle and having a projecting shell at the opposite side, said shell being provided with an integral laterally extending flange forming a keeper, and resilient catches mounted on the coupling head and arranged to engage the said keepers.

10. An air brake coupling including a coupling head comprising an open frame, a conduit located within the frame, a nozzle projecting from one side of the frame and connected with the air conduit, a shell extending from the opposite side of the frame and having a laterally projecting flange, and a catch having a resilient stem extending through the front of the frame and connected with the latter, said catch being adapted to engage the keeper of the corresponding coupling head.

11. In an air brake coupling, the combination of a coupling head including a frame, a hanger receiving the frame, and having sides arranged in spaced relation with the sides of the frame, and longitudinal springs interposed between the frame and the sides of the hanger.

12. In an air brake coupling, the combination of a coupling head including a frame, a hanger receiving the frame and having sides arranged in spaced relation with the sides of the frame, and longitudinal springs secured to and carried by the sides of the frame and bearing against the sides of the hanger to yieldably maintain the frame in spaced relation with the sides of the hanger.

13. In an air brake coupling, the combination of a coupling head including a frame, a hanger receiving the frame of the coupling head and composed of a bottom and spaced sides, hanger loops extending upward from the sides of the hanger and arranged to receive the draw bar of a car coupler, and means for cushioning the frame of the coupling head.

14. In an air brake coupling, the combination of a coupling head including a frame, a hanger receiving the frame of the coupling head and composed of a bottom and spaced sides, hanger loops extending upward from the hanger and arranged to receive the draw bar of a car coupler, longitudinal side springs carried by the frame and interposed between the same and the sides of the hanger, and a coiled spring engaging the rear end of the frame.

In testimony, that I claim the foregoing as my own, I have hereto affixed my signature in the presence of two witnesses.

MARK A. BROWN.

Witnesses:
 JOHN H. SIGGERS,
 DAVID R. WAGNER.